US011705045B2

(12) United States Patent
Lv et al.

(10) Patent No.: US 11,705,045 B2
(45) Date of Patent: Jul. 18, 2023

(54) DATA GENERATION METHOD, DRIVING METHOD, COMPUTER DEVICE, DISPLAY APPARATUS AND SYSTEM

(71) Applicants: Beijing BOE Optoelectronics Technology Co., Ltd., Beijing (CN); BOE Technology Group Co., Ltd., Beijing (CN)

(72) Inventors: Yaoyu Lv, Beijing (CN); Zhanshan Ma, Beijing (CN); Yachong Xue, Beijing (CN); Menglei Zhang, Beijing (CN); Lili Chen, Beijing (CN); Hao Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 123 days.

(21) Appl. No.: 17/417,237

(22) PCT Filed: Sep. 11, 2020

(86) PCT No.: PCT/CN2020/114673
§ 371 (c)(1),
(2) Date: Jun. 22, 2021

(87) PCT Pub. No.: WO2022/052020
PCT Pub. Date: Mar. 17, 2022

(65) Prior Publication Data
US 2022/0327983 A1 Oct. 13, 2022

(51) Int. Cl.
*G09G 3/20* (2006.01)
*G09G 3/00* (2006.01)

(52) U.S. Cl.
CPC ............ *G09G 3/2007* (2013.01); *G09G 3/001* (2013.01)

(58) Field of Classification Search
CPC .......................... G09G 3/2007; G09G 3/001
(Continued)

(56) References Cited

U.S. PATENT DOCUMENTS

| 4,160,973 | A | 7/1979 | Berlin, Jr. | |
| 6,765,566 | B1 * | 7/2004 | Tsao ..................... | H04N 13/363 353/7 |

(Continued)

FOREIGN PATENT DOCUMENTS

| CN | 101022565 A | 8/2007 |
| CN | 101594547 A | 12/2009 |

(Continued)

*Primary Examiner* — Amare Mengistu
*Assistant Examiner* — Gloryvid Figueroa-Gibson
(74) *Attorney, Agent, or Firm* — Nath, Goldberg & Meyer; Joshua B. Goldberg (57) ABSTRACT

Disclosed are a method for generating display data by a rotatory stereoscopic display apparatus, a display driving method, a computer device, a rotatory stereoscopic display apparatus, and a stereoscopic display system. The method for generating display data includes: generating, based on display parameters of the rotatory stereoscopic display apparatus and a model to be displayed, an image array for displaying the model; generating, for an image in the image array, an initial data stream of the image, the initial data stream including: grayscale datum of each pixel in the image; and performing data compression on the initial data stream to generate a compressed data stream, the compressed data stream including: data units of pixels whose grayscale data is non-zero data, each data unit including: grayscale datum of the pixel and an order of the grayscale datum in the initial data stream.

13 Claims, 5 Drawing Sheets

(58) Field of Classification Search
USPC .......................................................... 345/690
See application file for complete search history.

(56) References Cited

U.S. PATENT DOCUMENTS

| | | | | |
|---|---|---|---|---|
| 2003/0169248 | A1* | 9/2003 | Kim | G09G 3/3611 345/204 |
| 2005/0035962 | A1* | 2/2005 | Ishibashi | G09G 3/003 345/110 |
| 2015/0215497 | A1* | 7/2015 | Zhang | H04N 21/6336 348/521 |

FOREIGN PATENT DOCUMENTS

| | | |
|---|---|---|
| CN | 102254515 A | 11/2011 |
| CN | 103871094 A | 6/2014 |
| CN | 103871352 A | 6/2014 |
| CN | 110505465 A | 11/2019 |
| JP | H0434543 A | 2/1992 |

\* cited by examiner

| 18 | 19 | 20 | 21 | 22 | 23 | 24 | 25 | 26 | 27 | 28 | 29 | 4th light emitting group |
| 18 | 19 | 20 | 21 | 22 | 23 | 24 | 25 | 26 | 27 | 28 | 29 | 3rd light emitting group |
| 18 | 19 | 20 | 21 | 22 | 23 | 24 | 25 | 26 | 27 | 28 | 29 | 2nd light emitting group |
| 18 | 19 | 20 | 21 | 22 | 23 | 24 | 25 | 26 | 27 | 28 | 29 | 1st light emitting group |
| 17 | 16 | 15 | 14 | 13 | 12 | 34 | 33 | 32 | 31 | 30 | 29 | 4th light emitting group |
| 17 | 16 | 15 | 14 | 13 | 12 | 34 | 33 | 32 | 31 | 30 | 29 | 3rd light emitting group |
| 17 | 16 | 15 | 14 | 13 | 12 | 34 | 33 | 32 | 31 | 30 | 29 | 2nd light emitting group |
| 17 | 16 | 15 | 14 | 13 | 12 | 34 | 33 | 32 | 31 | 30 | 29 | 1st light emitting group |
| 6 | 7 | 8 | 9 | 10 | 11 | 35 | 36 | 37 | 38 | 39 | 40 | 4th light emitting group |
| 6 | 7 | 8 | 9 | 10 | 11 | 35 | 36 | 37 | 38 | 39 | 40 | 3rd light emitting group |
| 6 | 7 | 8 | 9 | 10 | 11 | 35 | 36 | 37 | 38 | 39 | 40 | 2nd light emitting group |
| 6 | 7 | 8 | 9 | 10 | 11 | 35 | 36 | 37 | 38 | 39 | 40 | 1st light emitting group |
| 5 | 4 | 3 | 2 | 1 | 47 | 46 | 45 | 44 | 43 | 42 | 41 | 4th light emitting group |
| 5 | 4 | 3 | 2 | 1 | 47 | 46 | 45 | 44 | 43 | 42 | 41 | 3rd light emitting group |
| 5 | 4 | 3 | 2 | 1 | 47 | 46 | 45 | 44 | 43 | 42 | 41 | 2nd light emitting group |
| 5 | 4 | 3 | 2 | 1 | 47 | 46 | 45 | 44 | 43 | 42 | 41 | 1st light emitting group |

DATA GENERATION METHOD, DRIVING METHOD, COMPUTER DEVICE, DISPLAY APPARATUS AND SYSTEM

This is a National Phase Application filed under 35 U.S.C. 371 as a national stage of PCT/CN2020/114673, filed on Sep. 11, 2020, the entire contents of which are hereby incorporated by reference.

TECHNICAL FIELD

The present disclosure relates to the field of display technology, and particularly relates to a method for generating display data by a rotatory stereoscopic display apparatus, a display driving method, a computer device, a rotatory stereoscopic display apparatus, and a stereoscopic display system.

BACKGROUND

The rotatory stereoscopic display, as a true three-dimensional display method, realizes three-dimensional display through synchronization of plane electronic frame scanning and mechanical volume frame scanning. A planar display panel is typically rotated around a fixed axis of rotation at a high speed to obtain a three-dimensional display space in a sweeping mode. The display panel is rotated to different angles to display different images, and achieves the effect of true three-dimensional display by means of the effect of persistence of vision on human eyes.

SUMMARY

The embodiments of the present disclosure provide a method for generating display data by a rotatory stereoscopic display apparatus, a display driving method, a computer device, a rotatory stereoscopic display apparatus, and a stereoscopic display system.

In order to achieve the above objects, the present disclosure provides a method for generating display data by a rotatory stereoscopic display apparatus, including: generating, based on display parameters of the rotatory stereoscopic display apparatus and a model to be displayed, an image array for displaying the model; generating, for an image in the image array, an initial data stream of the image, the initial data stream including: grayscale datum of each pixel in the image; and performing data compression on the initial data stream to generate a compressed data stream, the compressed data stream including: data units of pixels whose grayscale data is non-zero data, each data unit including: grayscale datum of the pixel and an order of the grayscale datum in the initial data stream.

In some embodiments, the rotatory stereoscopic display apparatus includes a display panel including a plurality of partitions, each of the partitions including a plurality of light emitting units, the light emitting units of the display panel corresponding to pixels in the image one by one; wherein the rotatory stereoscopic display apparatus further includes: a plurality of driver chips that correspond to the partitions one by one, the driver chips being configured to drive the plurality of light emitting units in respective partitions to emit light; wherein the step of generating, for the image in the image array, the initial data stream of the image includes: obtaining grayscales of pixels in the image corresponding to the respective light emitting units; merging grayscale data of the pixels corresponding to the light emitting units in each partition to generate a partition data stream of the partition; and merging partition data streams of the plurality of partitions to generate the initial data stream.

In some embodiments, the plurality of light emitting units in each partition are divided into a plurality of light emitting groups each including a plurality of light emitting units sequentially arranged according to a predetermined trajectory, and the driver chip sequentially drives the light emitting groups to emit light according to a predetermined driving sequence, and wherein the step of merging grayscale datum of the pixels corresponding to the light emitting units in each partition to generate the partition data stream of the partition includes: sequentially arranging, for each light emitting group, grayscales of the plurality of pixels corresponding to the plurality of light emitting units in the light emitting group according to an arrangement sequence of the plurality of light emitting units in the light emitting group, so as to generate a grayscale sequence of each light emitting group; and sequentially arranging the grayscale sequences of the plurality of light emitting groups according to the predetermined driving sequence to generate the partition data stream.

In some embodiments, the number of light emitting units in each partition is N, and the number of the partitions is M; and wherein the step of merging partition data streams of the plurality of partitions to generate the initial data stream includes: obtaining the $n^{th}$ grayscale datum from the partition data stream of each partition, and sequentially arranging the obtained M grayscale data to generate the $n^{th}$ data group; traversing n through integers from 1 to N to obtain N data groups; and sequentially arranging the N data groups to generate the initial data stream.

In some embodiments, the plurality of light emitting units in each partition are arranged in an array, the image includes a plurality of sub-images corresponding to the partitions one by one; and wherein the steps of obtaining grayscales of pixels in the image corresponding to each light emitting unit includes: obtaining a position of a pixel corresponding to a reference position of each partition in the image, and taking the position as an initial position of the sub-image; determining a column offset and a row offset of a position of the light emitting unit relative to the reference position; determining a position of a pixel corresponding to the light emitting unit in the image according to the initial position of the sub-image corresponding to the light emitting unit, the column offset and the row offset; and determining a grayscale value of the pixel according to the position of the pixel in the image.

In some embodiments, the method for generating display data further includes: inserting an identifier between the compressed data streams corresponding to two adjacent frames of images.

In some embodiments, the method for generating display data further includes: generating a data frame file according to the compressed data stream of each frame of image in the image array, and transmitting the data frame file to the rotatory stereoscopic display apparatus.

In an embodiment of the present disclosure, there is further provided a display driving method for a rotatory stereoscopic display apparatus including a display panel, the display driving method including: obtaining the compressed data stream generated by the method for generating display data according to any one of the above embodiments; decompressing the compressed data stream according to the grayscale data in the respective data units and the orders of the grayscale data in the initial data stream to generate the initial data stream; and driving the display panel to display according to the grayscale data of the respective pixels in the initial data stream.

In some embodiments, the display panel includes a plurality of partitions, each of the partitions including a plurality of light emitting units, the light emitting units of the display panel corresponding to pixels in the image one by one; and the step of driving the display panel to display according to the grayscale data of the respective pixels in the initial data stream includes: splitting the initial data stream to obtain a partition data stream corresponding to each partition; wherein the partition data stream of each partition includes: grayscale data of pixels corresponding to the light emitting units in the partition; and driving the light emitting units of the plurality of partitions to emit light in parallel according to the partition data streams of the plurality of partitions.

In an embodiment of the present disclosure, there is further provided a computer device, including: a processor; and a memory having a program stored thereon which, when executed by the processor, causes the method for generating display data according to any one of the above embodiments to be implemented.

In an embodiment of the present disclosure, there is further provided a rotatory stereoscopic display apparatus, including: a display panel; a decompression device configured to obtain a compressed data stream generated by the computer device as described above; and decompress the compressed data stream according to the grayscale data in the respective data units and the orders of the grayscale data in the initial data stream to generate the initial data stream; and a driving device configured to drive the display panel to display according to the grayscale data of the respective pixels in the initial data stream.

In some embodiments, the display panel includes a plurality of partitions, each of which including a plurality of light emitting units, the light emitting units of the display panel corresponding to pixels in the image one by one; wherein the driving device includes: a data distribution structure, and a plurality of driver chips corresponding to the partitions one by one; wherein the data distribution structure is configured to split the initial data stream to obtain partition data streams corresponding to the respective partitions, and transmit the partition data streams to the corresponding driver chips; wherein the partition data stream of each partition includes: grayscale data of pixels corresponding to the respective light emitting units in the partition; and wherein the driver chip is configured to drive the light emitting units in the partition to emit light according to the partition data stream of the partition.

In some embodiments, the plurality of light emitting units in each partition are divided into a plurality of light emitting groups each including a plurality of light emitting units sequentially arranged according to a predetermined trajectory, and the driver chip is specifically configured to sequentially provide driving signals for the plurality of light emitting groups, wherein the driving signal provided for the $b^{th}$ light emitting unit in the $a^{th}$ light emitting group is determined according to the $b^{th}$ grayscale datum in the $a^{th}$ grayscale sequence in the partition data stream.

In an embodiment of the present disclosure, there is further provided a stereoscopic display system, including: the computer device as described above and the rotatory stereoscopic display apparatus as described above.

BRIEF DESCRIPTION OF THE DRAWINGS

Accompanying drawings are provided for further understanding of this disclosure and constitute a part of the specification. Hereinafter, these drawings are intended to explain the disclosure together with the following specific embodiments, but should not be considered as a limitation to the disclosure. In the drawings.

DETAILED DESCRIPTION

Hereinafter, specific embodiments of the present disclosure will be described in conjunction with the accompanying drawings. It should also be understood that the specific embodiments as set forth herein are merely for the purpose of illustration and explanation of the disclosure and should not be constructed as a limitation thereof.

Figure 1:
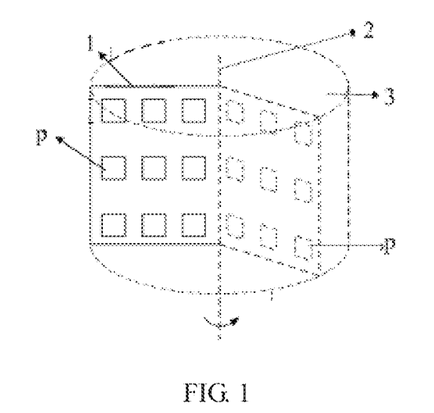
FIG. 1 is a schematic diagram illustrating a principle of a rotatory stereoscopic display apparatus for implementing three-dimensional display.

FIG. 1 is a schematic diagram illustrating a principle of a rotatory stereoscopic display apparatus for implementing three-dimensional display. As shown in FIG. 1, a display panel 1 is rotated around a fixed axis of rotation 2 at a high speed to obtain a three-dimensional display space in a sweeping mode. The display panel 1 is rotated to different angles to display different images, which achieves the effect of true three-dimensional display by means of the effect of persistence of vision of human eyes. The display panel 1 sweeps one circle to refresh one volume frame for the rotatory stereoscopic display apparatus, and a plurality of display positions (i.e., phases) are selected within one volume frame. An image is refreshed when the display panel 1 is rotated to each of the phases, and such an image is called an electronic frame. Each pixel p on the electronic frame within a cylindrical three-dimensional display space 3 is referred to as a voxel. Since the effect of persistence of vision of human eyes requires that a frame rate of the volume frame is not less than 24 Hz (i.e., at least 24 volume frames are refreshed per second, i.e., a rotation speed of the axis of rotation 2 is not less than 24 r/s), if 180 phases are included in one volume frame (i.e., the interval between adjacent phases for refreshing the electronic frame is 2°), it is required that a refresh rate of the display panel 1 is not less than 180×24 Hz=4320 Hz.

Figure 2:
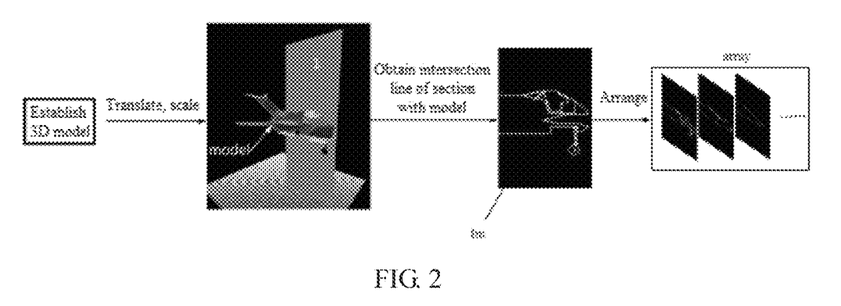
FIG. 2 is a schematic diagram of a display content generation process for a rotatory stereoscopic display apparatus.

FIG. 2 is a schematic diagram of a display content generation process for a rotatory stereoscopic display apparatus. As shown in FIG. 2, the display content generation process includes: (1) establishing a three-dimensional model using three-dimensional modeling software such as 3DMax and the like, and calculating an actual size of the cylindrical display space according to a size of a display panel; and performing processing such as translation and zooming on the three-dimensional model so that the display apparatus could fully display the model; (2) obtaining the intersection line of a section of each phase with the processed model to obtain sectional images Im to be displayed of the respective phases; and (3) arranging the sectional images of all phases according to a sequence of rotation angles to obtain an image array, and displaying by a display apparatus according to the image array.

Generally, the display content generation process is completed in an off-line state. That is, image arrays are obtained in advance according to three-dimensional models. When a certain three-dimensional model is required to be displayed, the rotatory stereoscopic display apparatus only needs to load the corresponding image array. However, as can be seen from the above description, the valid data in the image array are only the pixel data of an outline of the sectional image; and therefore, loading the data of all pixels of each sectional image may result in an excessive data volume, which will affect the operation speed of the whole display system.

Figure 3:
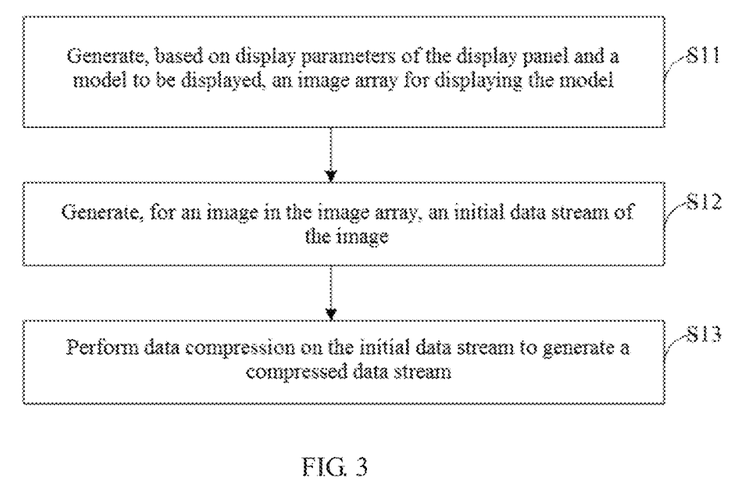
FIG. 3 is a flowchart of a method for generating display data of a rotatory stereoscopic display apparatus provided in an embodiment of the present disclosure.

FIG. 3 is a flowchart of a method for generating display data of a rotatory stereoscopic display apparatus provided in an embodiment of the present disclosure, wherein the rotatory stereoscopic display apparatus is configured to display an image array obtained according to a model (e.g., a three-dimensional model) to be displayed, and the display panel is configured to display each frame of image (i.e., an electronic frame) in the image array. As shown in FIG. 3, the method for generating display data of the rotatory stereoscopic display apparatus includes the following steps S11 to S13.

At step S11, generating, based on display parameters of the rotatory stereoscopic display apparatus and the model to be displayed, an image array for displaying the model. The display parameters of the rotatory stereoscopic display apparatus may include: a resolution of the display panel of the rotatory stereoscopic display apparatus, a pixel size, a distance between pixels, the number of phases, etc. The method for generating the image array has been described above and will not be repeated herein.

At step S12, generating, for an image in the image array, an initial data stream of the image, the initial data stream including: grayscale datum of each pixel in the image.

At step S13, performing data compression on the initial data stream to generate a compressed data stream, the compressed data stream including: data units of pixels whose grayscale data is non-zero data, each data unit including: grayscale datum of the pixel and an order of the grayscale datum in the initial data stream.

It should be noted that the plurality of grayscale data in the initial data stream are sequentially arranged, and the order of the grayscale datum in the initial data stream refers to a position of the grayscale datum in the initial data stream, i.e., the ordinal number or rank of the grayscale datum in the initial data stream.

For example, step S13 may include: sequentially traversing each grayscale datum in the initial data stream, directly skipping any grayscale datum that is zero, and if a grayscale datum is non-zero, generating a corresponding data unit.

After step S13, the compressed data streams corresponding to all images in the image array may be transmitted to the rotatory stereoscopic display apparatus to display.

It should be noted that each pixel in the image may include a plurality of sub-pixels of different colors, such as red sub-pixels, green sub-pixels, and blue sub-pixels, and the grayscale datum of each pixel includes the grayscale of each sub-pixel therein. The grayscale datum is nonzero datum means that not all grayscales of the sub-pixels in the pixel are zero, that is, the grayscale of at least one sub-pixel in the pixel is not zero. It will be appreciated that when the grayscale datum of a pixel is zero, the pixel displays black, and at this time, the grayscale datum of this pixel may be regarded as invalid datum.

In an embodiment of the present disclosure, a compressed data stream is provided to the rotatory stereoscopic display apparatus, wherein the compressed data stream does not include data or datum whose grayscale is Zero. Therefore, the data transmission quantity can be greatly reduced, thereby increasing the overall operation speed of the display system. Further, each data unit in the compressed data stream includes: each non-zero grayscale datum and its order in the initial data stream. Therefore, after receiving the compressed data stream, the rotatory stereoscopic display apparatus may decompress the compressed data stream according to the grayscale data and orders in the respective data units to restore the initial data stream, and therefore, the normal display of the rotatory stereoscopic display apparatus can be ensured.

In an embodiment of the present disclosure, the display panel includes a plurality of light emitting units that emit light under driving of a driver chip. As described above, in order to realize the effect of true three-dimensional display, the refresh rate of the display panel is required to be not less than 4320 Hz, that is, a display period of each frame of image should be sufficiently short. When all the light emitting units of the display panel are driven by the same driver chip, the limitation of the driving capability of the driver chip will cause the display period of each frame of image to be longer, so the required refresh rate is difficult to achieve.

In view of this, in some embodiments of the present disclosure, the display panel is divided into a plurality of partitions, and is provided with a plurality of driver chips corresponding to the partitions one by one. In this manner, display data of respective partitions can be provided for the corresponding driver chips at the same time; and since the light emitting units driven by a driver chip are only a part of the light emitting units in the display panel, when the plurality of driver chips drive the respective partitions in parallel for display, the display period of each frame of image can be shortened, which is favorable for improving the image refresh rate of the display panel.

Figure 4:
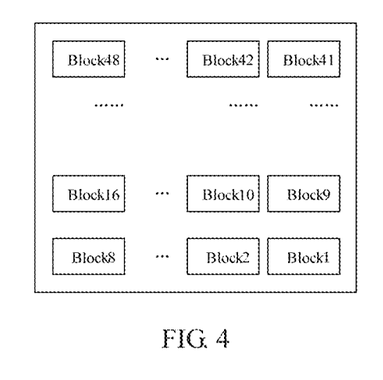
FIG. 4 is a schematic diagram illustrating an arrangement of a plurality of partitions of a display panel according to an embodiment of the present disclosure.

FIG. 4 is a schematic diagram illustrating an arrangement of a plurality of partitions of a display panel according to an embodiment of the present disclosure. As shown in FIG. 4, a plurality of partitions of the display panel, i.e., Block1 to Block48, may be arranged in an array. Each partition includes a plurality of light emitting units that may be arranged in an array. Each frame of image in the image array includes a plurality of sub-images corresponding to the partitions one by one, and the light emitting units in each partition are configured to display the sub-image corresponding to the partition. The light emitting units of the display panel correspond to the pixels of the image one by one, and the grayscale of each pixel is determined by luminous brightness of the corresponding light emitting unit. It should be noted that each pixel may include a plurality of single-color sub-pixels of different colors, and the color of the pixel is formed by mixing the colors of the plurality of sub-pixels. Each light emitting unit may include a plurality of single-color light emitting devices (e.g., Mini LEDs), and the grayscale of each pixel is determined by brightness of the light emitting unit. In addition, the number and arrangement of partitions of the display panel in FIG. 4 are only exemplary, and the present disclosure is not limited thereto.

Figure 5:
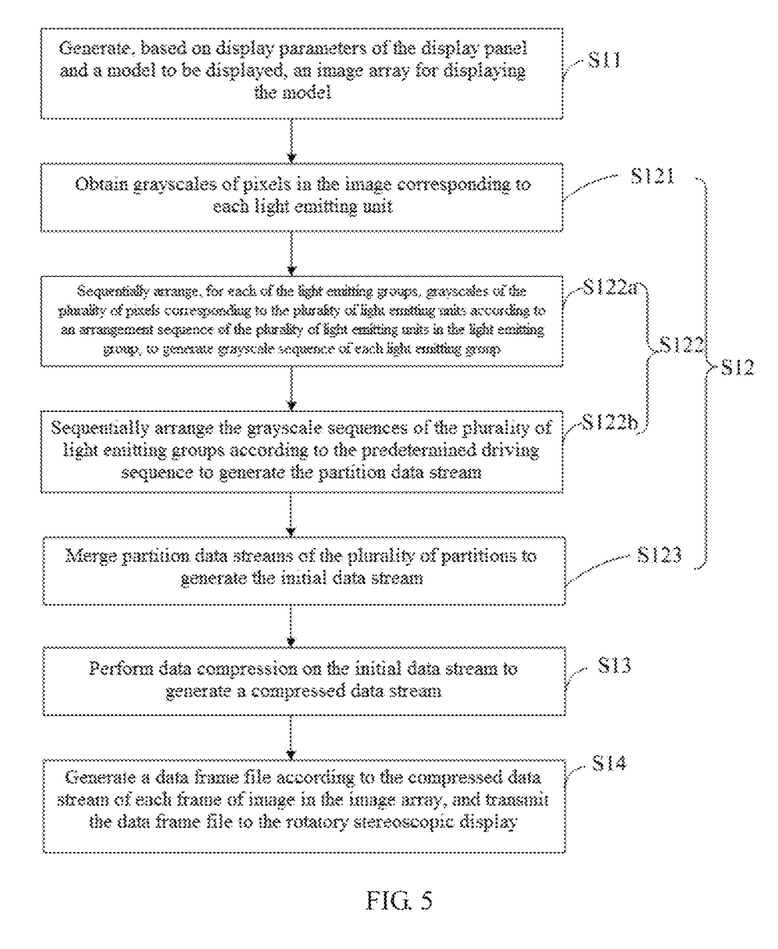
FIG. 5 is another schematic diagram of a method for generating display data provided by an embodiment of the present disclosure.

FIG. 5 is another schematic diagram of a method for generating display data according to an embodiment of the present disclosure. The method for generating display data according to the embodiment of the present disclosure is specifically described below with reference to FIG. 5. As shown in FIG. 5, the method for generating display data includes the following steps S11 to S14.

At step S11, generating, based on display parameters of the display panel and a model to be displayed, an image array for displaying the model.

At step S12, generating, for an image in the image array, an initial data stream of the image, the initial data stream including: grayscale datum of each pixel in the image.

In some embodiments, step S12 includes the following steps S121 to S123.

At step S121, obtaining grayscales of pixels in the image corresponding to the respective light emitting units.

For example, step S121 includes the following steps S121a to S121d.

At step S121a, obtaining a position of a pixel corresponding to a reference position of each partition in the image, and taking the position as an initial position of the sub-image. Optionally, the reference position of the partition is the position of a corner (e.g., a lower right corner) of the partition. The size and shape of each partition may be predetermined, and accordingly, the initial position of each sub-image may be predetermined.

At step S121b, determining a column offset and a row offset of a position of the light emitting unit relative to the reference position.

At step S121c, determining a position of a pixel corresponding to the light emitting unit in the image according to the initial position of the sub-image corresponding to the light emitting unit, the column offset and the row offset.

At step S121d, determining a grayscale value of the pixel according to the position of the pixel in the image.

At step S122, merging, for any partition, grayscale data of the pixels corresponding to the light emitting units in the partition to generate a partition data stream of the partition.

Figure 6:
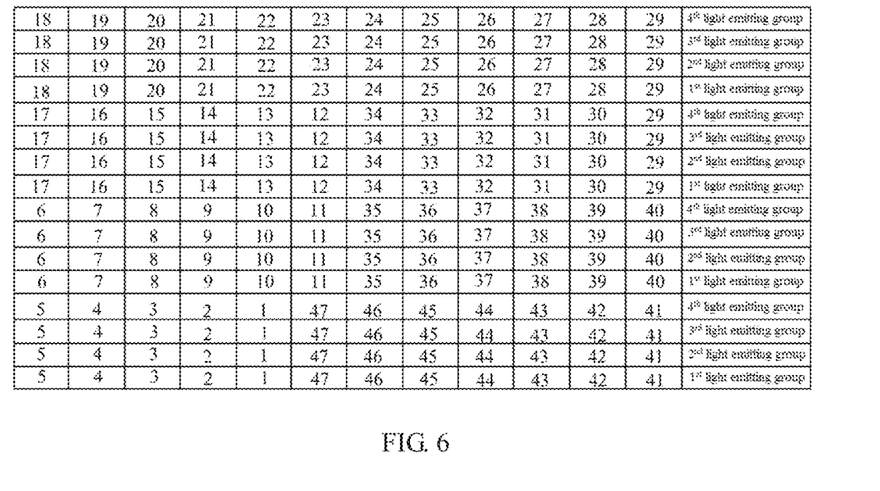
FIG. 6 is a schematic diagram illustrating an arrangement of light emitting units in one of the partitions provided in an embodiment of the present disclosure.

In some embodiments, the plurality of light emitting units in each partition are divided into a plurality of light emitting groups each including a plurality of light emitting units sequentially arranged according to a predetermined trajectory. FIG. 6 is a schematic diagram illustrating an arrangement of light emitting units in one of the partitions provided in an embodiment of the present disclosure. Each numbered square in FIG. 6 represents a light emitting unit. The plurality of light emitting units in each partition are divided into four light emitting groups, each of which includes 48 light emitting units. The numbers in FIG. 6 indicate the arrangement order of the respective light emitting units in the light emitting groups. For example, in the first light emitting group, the first light emitting unit is located at column 5 of the last row in the partition, and the last light emitting unit is located at column 6 of the last row in the partition. The driver chip sequentially drives the light emitting groups to emit light according to a predetermined driving sequence. For example, the first light emitting group is driven first, then the second light emitting group, and the fourth light emitting group is driven last. The light emitting units in different partitions may be arranged in the same manner.

In this case, step S122 may specifically include steps S122a and S122b.

At step S122a, sequentially arranging, for each light emitting group, grayscales of the plurality of pixels corresponding to the plurality of light emitting units in the light emitting group according to an arrangement sequence of the plurality of light emitting units in the light emitting group, so as to generate a grayscale sequence of each light emitting group.

At step S122b, sequentially arranging the grayscale sequences of the plurality of light emitting groups according to the predetermined driving sequence to generate the partition data stream.

Figure 7:
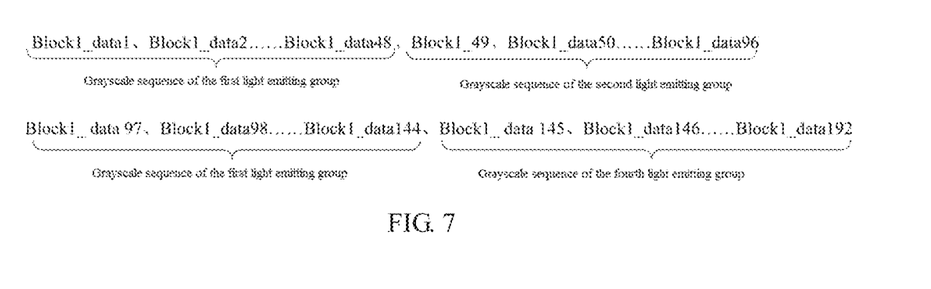
FIG. 7 shows a partition data stream of a first partition provided in an embodiment of the present disclosure.

In a specific example, the arrangement shown in FIG. 6 is taken as an example in each partition. For example, for the first partition, the grayscale data of the pixels corresponding to the $1^{st}$ to $48^{th}$ light emitting units in the first light emitting group are respectively: Block1_data1, Block1_data2 . . . Block1_data48; the grayscale data of the pixels corresponding to the $1^{st}$ to $48^{th}$ light emitting units in the second light emitting group are respectively: Block1_data49, Block1_data50 . . . Block1_data96; the grayscale data of the pixels corresponding to the $1^{st}$ to $48^{th}$ light emitting units in the third light emitting group are respectively: Block1_data97, Block1_data98 . . . Block1_data144; and the grayscale datum of the pixels corresponding to the $1^{st}$ to $48^{th}$ light emitting units in the fourth light emitting group are respectively Block1_data145, Block1_data146 . . . Block1_data192. The driver chip sequentially drives the first, the second, the third and the fourth light emitting groups. In this case, FIG. 7 shows a partition data stream of a first partition provided in an embodiment of the present disclosure. As shown in FIG. 7, the grayscale sequence of the first light emitting group is: Block1_data1, Block1_data2 . . . Block1_data48; the grayscale sequence of the second light emitting group is: Block1_data49, Block1_data50 . . . Block1_data96; the grayscale sequence of the third light emitting group is: Block1_data97, Block1_data98 . . . Block1_data144; and the grayscale sequence of the fourth light emitting group is: Block1_data145, Block1_data146 . . . Block1_data192. The partition data stream of the first partition is: Block1_data1, Block1_data2 . . . Block1_data48, Block1_data49, Block1_data50 . . . Block1_data96, Block1_data97 . . . Block1_data144, Block1_data145 . . . Block1_data192.

At step S123, merging partition data streams of the plurality of partitions to generate the initial data stream.

In some embodiments, the partition data streams of the plurality of partitions may be merged in a crisscross manner such that the generated initial data stream includes N data groups arranged in sequence, each data group including M grayscale data. N is the number of light emitting units in each partition, and M is the number of partitions. The $n^{th}$ data group is obtained by sequentially arranging all of the $n^{th}$ grayscale data in the partition data streams of the first to the $M^{th}$ partitions, where $1 \leq n \leq N$, and n is an integer. That is, step S123 includes: obtaining the $n^{th}$ grayscale datum from the partition data stream of each partition, and sequentially arranging the obtained M grayscale data to generate the $n^{th}$ data group; traversing n through integers from 1 to N to obtain N data groups; and sequentially arranging the N data groups to generate the initial data stream. Specifically, the $1^{st}$ grayscale data in the partition data streams of the respective partitions are merged to generate the $1^{st}$ data group; the $2^{nd}$ grayscale data in the partition data streams of the partitions are merged to generate the $2^{nd}$ data group; and by such analogy, finally N data groups are generated. In this manner, each time grayscale data in one data group are obtained by a data distribution structure of the rotary stereoscopic display apparatus, the data distribution structure may transmit the plurality of data in the data group to the plurality of driver chips, respectively, so that parallel driving by the plurality of driver chips can be achieved without caching the data of the data group.

Figure 8:
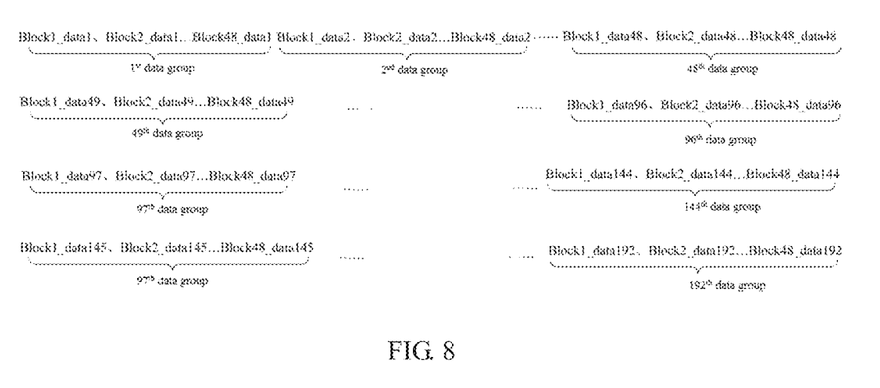
FIG. 8 is a schematic diagram of respective data groups in a partition data stream provided in an embodiment of the present disclosure.

For example, the partition data and arrangement of the display panel are as shown in FIG. 4. As in the above example, the partition data stream corresponding to the first partition is: Block1_data1, Block1_data2 . . . Block1_data192. Likewise, the partition data stream of the second partition is: Block2_data1, Block2_data2 . . . Block2_data192. By such analogy, the partition data stream of the $48^{th}$ partition is: Block48_data1, Block48_data2 . . . Block48_data192. Then, the number of data groups is 192. The data stream in each data group is shown in FIG. 8. The $1^{st}$ data group is: Block1_data1, Block2_data1 . . . Block48_data1. The $2^{nd}$ data group is: Block1_data2, Block2_data2 . . . Block48_data2. By such analogy, the $192^{nd}$ data group is: Block1_data192, Block2_data192 . . . Block48_data192. The data streams of the data groups are arranged in sequence to form an initial data stream.

At step S13, performing data compression on the initial data stream to generate a compressed data stream, the compressed data stream including: data units of pixels whose grayscale data is non-zero data, each data unit including: a first tag, grayscale datum of the pixel and an order of the grayscale datum in the initial data stream.

At step S14, generating a data frame file according to the compressed data stream of each frame of image in the image array, and transmitting the data frame file to the rotary stereoscopic display apparatus. The data frame file may be transmitted to the rotary stereoscopic display apparatus in a wireless manner, e.g., via Bluetooth.

In some embodiments, the method for generating display data further includes: inserting an identifier between the compressed data streams corresponding to two adjacent frames of images. In step S14, a data frame file is generated according to the compressed data stream of each frame of image in the image array and the identifier between each two adjacent frames. The identifier is beneficial to the rotary stereoscopic display apparatus to accurately judge the data.

In some embodiments, the data frame file may include a header and a trailer so that upon receiving a data frame file, the rotary stereoscopic display apparatus may determine the integrity of the data packet according to the header and the trailer.

In practical applications, the data frame file may adopt a binary bin format, which can avoid encoding and decoding processes during transmission.

Figure 9:
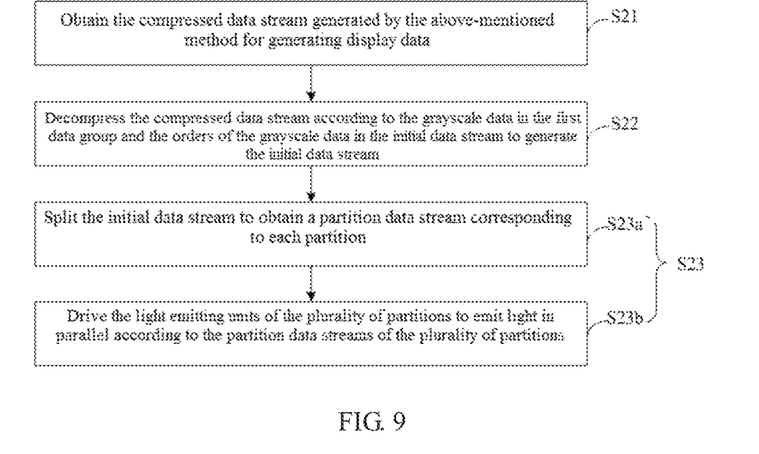
FIG. 9 is a flowchart of a display driving method for a rotatory stereoscopic display apparatus provided by an embodiment of the present disclosure.

FIG. 9 is a flowchart of a display driving method for a rotatory stereoscopic display apparatus according to an embodiment of the present disclosure, wherein the rotatory stereoscopic display apparatus includes a display panel. In the display driving method, the display panel is driven to display according to the compressed data stream generated by the method for generating display data as described in any of the above embodiments. The display driving method includes steps S21 to S23.

At step S21, obtaining the compressed data stream generated by the method for generating display data as described above.

At step S22, decompressing the compressed data stream according to the grayscale data in the data units and the orders of the grayscale data in the initial data stream to generate the initial data stream.

Figure 10:
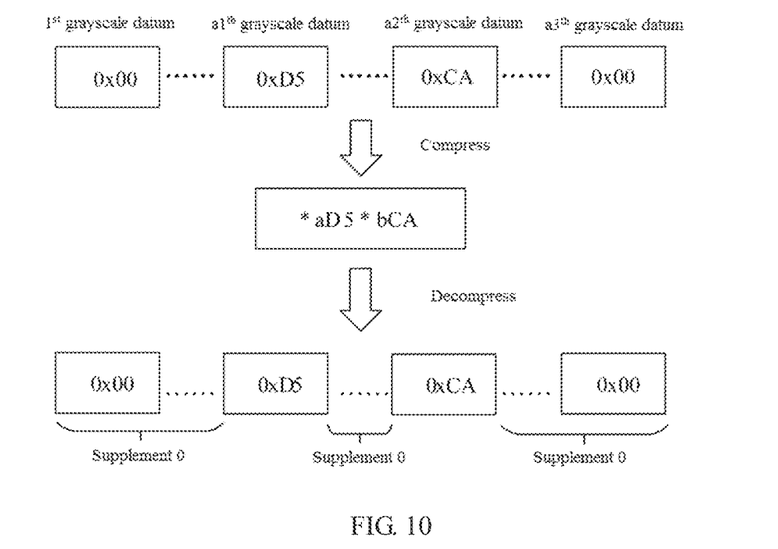
FIG. 10 is a schematic diagram of data compression and decompression processes provided in an embodiment of the present disclosure.

FIG. 10 is a schematic diagram of data compression and decompression processes provided in an embodiment of the present disclosure. As shown in FIG. 10, in an initial data stream, each grayscale datum is hexadecimal, a data type may be an 8-bit unsigned char, invalid datum is 0x00, each grayscale datum before the $a1^{th}$ grayscale datum is 0x00, the $a1^{th}$ grayscale datum is 0xD5, the $a2^{th}$ grayscale datum is 0xCA, and each grayscale datum after the $a2^{nd}$ grayscale datum is 0x00. As such, the compressed data stream is: *aD5*b*CA, wherein "*" indicates the first tag. When the compressed data stream is decompressed and "*" and "a1" are detected in sequence, a1-1 (pieces of) invalid data are supplemented, and then the $a1^{th}$ grayscale datum, D5, is read. Then, when "*" and "a2" are detected, a2-a1+1 invalid data are supplemented after the $a1^{th}$ grayscale datum, and then the $a2^{th}$ grayscale datum, CA, is read. By such analogy, the data decompression process is completed.

At step S23, driving the display panel to display according to the grayscale data of the respective pixels in the initial data stream.

As described above, the display panel includes a plurality of partitions, each of which including a plurality of light emitting units, the light emitting units of the display panel corresponding to pixels in the image one by one. The initial data stream is generated by merging partition data streams of a plurality of partitions; and accordingly, step S23 may specifically include steps S23a to S23b.

At step S23a, splitting the initial data stream to obtain a partition data stream corresponding to each partition, wherein the partition data stream of each partition includes: grayscale data of pixels corresponding to the light emitting units in the partition.

As described above, the initial data stream includes N data groups each including M grayscale data. Accordingly, step S23a may specifically include: obtaining and sequentially arranging the $m^{th}$ grayscale data in respective data groups to obtain a partition data stream of the $M^{th}$ partition, where 1≤m≤M, and m is an integer. Referring to the above examples, the initial data stream includes 192 data groups, and the data stream in each data group is as shown in FIG. 8. In this case, taking the first partition as an example, the partition data stream of the first partition is: a combination of the $1^{st}$ grayscale data in respective data groups, i.e., Block1_data1, Block1_data2 . . . Block1_data192.

At step S23b, driving the light emitting units of the plurality of partitions to emit light in parallel according to the partition data streams of the plurality of partitions. The partition data streams of the plurality of partitions may be delivered to the plurality of driver chips, respectively, and each driver chip drives the light emitting units in the corresponding partition to emit light according to the received partition data stream.

In step S23b, for any one of the partitions, the step of driving the light emitting units in the partition to emit light includes: sequentially providing driving signals for the plurality of light emitting groups, wherein a driving signal provided for the $b^{th}$ light emitting unit in the $a^{th}$ light emitting group is determined according to the $b^{th}$ grayscale datum in the $a^{th}$ grayscale sequence in the partition data stream, where a is a positive integer less than or equal to the total number of light emitting groups, and b is a positive integer less than or equal to the total number of light emitting units in each light emitting group.

Taking the first partition as an example, the partition data stream of the first partition is as described above, i.e., Block1_data1, Block1_data2 . . . Block1_data192. The light emitting units in the partition are arranged in a manner as shown in FIG. 6. Then, the grayscale sequence corresponding to the first light emitting group is: Block1_data1, Block1_data2 . . . Block1_data48; the grayscale sequence corresponding to the second light emitting group is: Block1_data49, Block1_data50 . . . Block1_data96; the grayscale sequence corresponding to the third light emitting group is: Block1_data97, Block1_data98 . . . Block1_data144; and the grayscale sequence corresponding to the fourth light emitting group is: Block1_data145, Block1_data146 . . . Block1_data192. The driver chip sequentially drives the first to fourth light emitting groups to emit light; and when driving the first light emitting group is to emit light, the driver chip drives the first light emitting unit to emit light according to the grayscale datum Block1_data1, drives the second light emitting unit to emit light according to the grayscale datum Block1_data2, and so forth.

Figure 11:
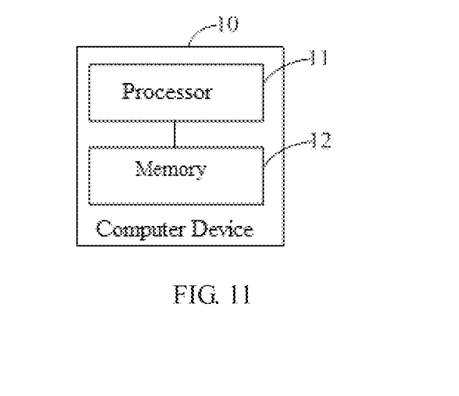
FIG. 11 is a schematic diagram of a computer device provided by an embodiment of the present disclosure.

FIG. 11 is a schematic diagram of a computer device according to an embodiment of the present disclosure. As shown in FIG. 11, the computer device 10 includes: a processor 11, and a memory 12 having a program stored thereon which, when executed by the processor 11, causes the method for generating display data according to any one of the above embodiments to be implemented.

The memory includes, but is not limited to, the following readable media: a random access memory (RAM), a read-only memory (ROM), a non-volatile random access memory (NVRAM), a programmable read-only memory (PROM), an erasable programmable read-only memory (EPROM), an electrically erasable programmable read only memory (EEPROM), a flash memory, a magnetic or optical data memory, a register, a magnetic disc or tape, an optical storage medium such as a compact disc (CD) or a DVD (digital versatile disc), and other non-transitory media. Examples of the processor 11 include, but are not limited to, general purpose processors, central processing units (CPUs), microprocessors, digital signal processors (DSPs), controllers, microcontrollers, state machines, and the like.

Figure 12:
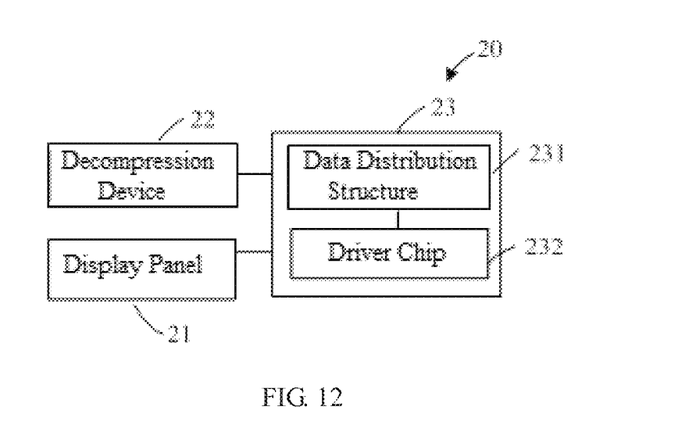
FIG. 12 is a schematic diagram of a rotatory stereoscopic display apparatus provided in an embodiment of the present disclosure.

FIG. 12 is a schematic diagram of a rotatory stereoscopic display apparatus provided in an embodiment of the present disclosure. As shown in FIG. 12, the rotatory stereoscopic display apparatus 20 includes: a display panel 21, a decompression device 22, and a driving device 23.

The display panel 21 is configured to display each frame of image in the image array. The decompression device 22 is configured to obtain a compressed data stream generated by the computer device as described above, and decompress the compressed data stream according to grayscale data in the respective data units and the orders of the grayscale data in an initial data stream to generate the initial data stream. The driving device 23 is configured to drive the display panel 21 to display according to the grayscale data of the respective pixels in the initial data stream.

In some embodiments, the display panel 21 includes a plurality of partitions, each of which including a plurality of light emitting units, the light emitting units of the display panel corresponding to pixels in the image one by one. The driving device 23 includes: a data distribution structure 231 and a plurality of driver chips 232 corresponding to the partitions one by one.

The data distribution structure 231 is configured to split the initial data stream to obtain partition data streams corresponding to the respective partitions, and transmit the partition data streams to the corresponding driver chips; wherein the partition data stream of each partition includes: grayscale data of pixels corresponding to the respective light emitting units in the partition. For example, the data distribution structure 231 is configured to employ an FPGA (Field-Programmable Gate Array). In addition to splitting data streams, the FPGA can also configure transmitting and receiving functions of the instructions as needed.

The driver chip 232 is configured to drive the light emitting units in the partition to emit light according to the partition data stream of the partition.

In some embodiments, the initial data stream includes N data groups each including M grayscale data, wherein N is the number of light emitting units in each partition, and M is the number of partitions. The data distribution structure is specifically configured to obtain and sequentially arrange the $m^{th}$ grayscale data in respective data groups to obtain a partition data stream of the $m^{th}$ partition, where $1 \le m \le M$, and m is an integer.

In some embodiments, the plurality of light emitting units in each partition are divided into a plurality of light emitting groups each including a plurality of light emitting units sequentially arranged according to a predetermined trajectory. The driver chip is specifically configured to sequentially provide driving signals for the plurality of light emitting groups, wherein a driving signal provided for the $b^{th}$ light emitting unit in the $a^{th}$ light emitting group is determined according to the $b^{th}$ grayscale datum in the $a^{th}$ grayscale sequence in the partition data stream.

Figure 13:
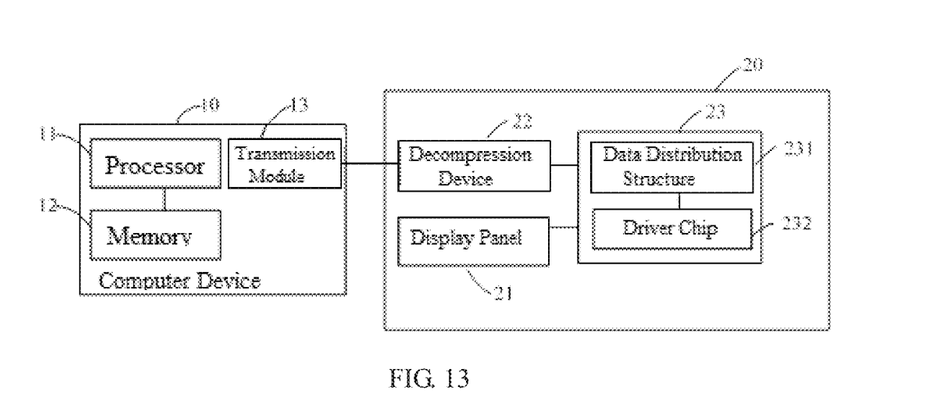
FIG. 13 is a schematic diagram of a stereoscopic display system provided an embodiment of the disclosure.

FIG. 13 is a schematic diagram of a stereoscopic display system provided by an embodiment of the disclosure. As shown in FIG. 13, the stereoscopic display system includes: the computer device 10 and the rotatory stereoscopic display apparatus 20 as described above. The computer device may further include a transmission module 13 configured to transmit a data frame file (e.g., via Bluetooth) to the rotatory stereoscopic display apparatus. The transmission module 13 may be further configured to transmit a current state of the rotatory stereoscopic display apparatus (e.g., whether the apparatus is ready or displaying, what contents are being displayed), and the computer device 10 may determine whether to transmit the data frame file according to the current state of the rotatory stereoscopic display apparatus.

In the whole stereoscopic display system, the computer device may generate display data in advance according to the model to be displayed so that when the rotatory stereoscopic display apparatus displays, the display data can be directly loaded to display, and thus the task assignment of the whole stereoscopic display system is more reasonable.

It will be appreciated that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:
1. A method for generating display data of a rotatory stereoscopic display apparatus, comprising:

generating, based on display parameters of the rotatory stereoscopic display apparatus and a model to be displayed, an image array for displaying the model;
generating, for an image in the image array, an initial data stream of the image, the initial data stream comprising: grayscale datum of each pixel in the image; and
performing data compression on the initial data stream to generate a compressed data stream, the compressed data stream comprising: data units of pixels whose grayscale data is non-zero data, each data unit comprising: the grayscale datum of each pixel and an order of the grayscale datum in the initial data stream,
wherein the rotatory stereoscopic display apparatus comprises a display panel comprising a plurality of partitions, each of the partitions comprising a plurality of light emitting units, the light emitting units of the display panel corresponding to pixels in the image one by one;
wherein the step of generating, for the image in the image array, the initial data stream of the image comprises:
obtaining grayscales of pixels in the image corresponding to the respective light emitting units;
merging grayscale data of the pixels corresponding to the light emitting units in each partition to generate a partition data stream of the partition; and
merging partition data streams of the plurality of partitions to generate the initial data stream; and
wherein the rotatory stereoscopic display apparatus further comprises: a plurality of driver chips that correspond to the partitions one by one, the driver chips being configured to drive the plurality of light emitting units in respective partitions to emit light.

2. The method for generating display data according to claim 1, wherein the plurality of light emitting units in each partition are divided into a plurality of light emitting groups each comprising a plurality of light emitting units sequentially arranged according to a predetermined trajectory, and each of the driver chips sequentially drives the light emitting groups in the corresponding partition to emit light according to a predetermined driving sequence, and
wherein the step of merging grayscale data of the pixels corresponding to the light emitting units in each partition to generate the partition data stream of the partition comprises:
sequentially arranging, for each light emitting group, grayscales of the plurality of pixels corresponding to the plurality of light emitting units in the light emitting group according to an arrangement sequence of the plurality of light emitting units in the light emitting group, so as to generate a grayscale sequence of each light emitting group; and
sequentially arranging the grayscale sequences of the plurality of light emitting groups according to the predetermined driving sequence to generate the partition data stream.

3. The method for generating display data according to claim 1, wherein the number of light emitting units in each partition is N, and the number of the partitions is M; and
wherein the step of merging partition data streams of the plurality of partitions to generate the initial data stream comprises:
obtaining the $n^{th}$ grayscale datum from the partition data stream of each partition, and sequentially arranging the obtained M grayscale data to generate the $n^{th}$ data group;
traversing n through integers from 1 to N to obtain N data groups; and
sequentially arranging the N data groups to generate the initial data stream.

4. The method for generating display data according to claim 1, wherein the plurality of light emitting units in each partition are arranged in an array, the image comprises a plurality of sub-images corresponding to the partitions one by one; and
wherein the steps of obtaining grayscales of pixels in the image corresponding to each light emitting unit comprises:
obtaining a position of a pixel corresponding to a reference position of each partition in the image, and taking the position as an initial position of the sub-image;
determining a column offset and a row offset of a position of the light emitting unit relative to the reference position;
determining a position of a pixel corresponding to the light emitting unit in the image according to the initial position of the sub-image corresponding to the light emitting unit, the column offset and the row offset; and
determining a grayscale value of the pixel according to the position of the pixel in the image.

5. The method for generating display data according to claim 1, wherein the method for generating display data further comprises:
inserting an identifier between the compressed data streams corresponding to two adjacent frames of images.

6. The method for generating display data according to claim 1, wherein the method for generating display data further comprises: generating a data frame file according to the compressed data stream of each frame of image in the image array, and transmitting the data frame file to the rotatory stereoscopic display apparatus.

7. A computer device, comprising:
a processor; and
a memory having a program stored thereon which, when executed by the processor, causes the method for generating display data according to claim 1 to be implemented.

8. The rotatory stereoscopic display apparatus, comprising:
a display panel;
a decompression device configured to obtain a compressed data stream generated by the computer device of claim 7; and decompress the compressed data stream according to the grayscale data in the respective data units and the orders of the grayscale data in the initial data stream to generate the initial data stream; and
a driving device configured to drive the display panel to display according to the grayscale data of the respective pixels in the initial data stream.

9. The rotatory stereoscopic display apparatus according to claim 8,
wherein the driving device comprises: a data distribution structure, and a plurality of driver chips corresponding to the partitions one by one;
wherein the data distribution structure is configured to split the initial data stream to obtain partition data streams corresponding to the respective partitions, and transmit the partition data streams to the corresponding driver chips; wherein the partition data stream of each partition comprises: grayscale data of pixels corresponding to the respective light emitting units in the partition; and wherein each of the driver chips is configured to drive the light emitting units in the corresponding partition to emit light according to the partition data stream of the partition.

10. The rotatory stereoscopic display apparatus according to claim 9, wherein the plurality of light emitting units in each partition are divided into M light emitting groups each comprising N light emitting units sequentially arranged according to a predetermined trajectory, where each of M and N is a positive integer greater than one, and each of the driver chips is specifically configured to sequentially provide driving signals for the light emitting groups in the corresponding partition, wherein the driving signal provided for a $b^{th}$ light emitting unit in an $a^{th}$ light emitting group is determined according to the $b^{th}$ grayscale datum in the $a^{th}$ grayscale sequence in the partition data stream, where a is any positive integer ranging from one to M, and b is any positive integer ranging from one to N.

11. A stereoscopic display system, comprising: the computer device according to claim 7 and the rotatory stereoscopic display apparatus, wherein the rotatory stereoscopic display apparatus comprising:

a display panel;

a decompression device configured to obtain a compressed data stream generated by the computer device; and decompress the compressed data stream according to the grayscale data in the respective data units and the orders of the grayscale data in the initial data stream to generate the initial data stream; and a driving device configured to drive the display panel to display according to the grayscale data of the respective pixels in the initial data stream.

12. A display driving method for a rotatory stereoscopic display apparatus comprising a display panel, the display driving method comprising:

obtaining a compressed data stream generated by a method for generating display data of a rotatory stereoscopic display apparatus, the method for generating display data comprising:

generating, based on display parameters of the rotatory stereoscopic display apparatus and a model to be displayed, an image array for displaying the model;

generating, for an image in the image array, an initial data stream of the image, the initial data stream comprising: grayscale datum of each pixel in the image; and performing data compression on the initial data stream to generate a compressed data stream, the compressed data stream comprising: data units of pixels whose grayscale data is non-zero data, each data unit comprising: the grayscale datum of each pixel and an order of the grayscale datum in the initial data stream;

decompressing the compressed data stream according to the grayscale data in the respective data units and the orders of the grayscale data in the initial data stream to generate the initial data stream; and driving the display panel to display according to the grayscale data of the respective pixels in the initial data stream, wherein the display panel comprises a plurality of partitions, each of the partitions comprising a plurality of light emitting units, the light emitting units of the display panel corresponding to pixels in the image one by one, wherein the step of generating, for the image in the image array, the initial data stream of the image comprises:

obtaining grayscales of pixels in the image corresponding to the respective light emitting units;

merging grayscale data of the pixels corresponding to the light emitting units in each partition to generate a partition data stream of the partition; and merging partition data streams of the plurality of partitions to generate the initial data stream.

13. The display driving method according to claim 12, wherein the step of driving the display panel to display according to the grayscale data of the respective pixels in the initial data stream comprises:

splitting the initial data stream to obtain a partition data stream corresponding to each partition; wherein the partition data stream of each partition comprises: grayscale data of pixels corresponding to the light emitting units in the partition; and driving the light emitting units of the plurality of partitions to emit light in parallel.

\* \* \* \* \*